United States Patent
Deb et al.

(10) Patent No.: US 8,817,811 B2
(45) Date of Patent: Aug. 26, 2014

(54) COMMUNICATIONS APPARATUS, SYSTEM AND METHOD WITH SCHEDULE CHECKING

(75) Inventors: Abhijit Kumar Deb, Eindhoven (NL); Hubertus Gerardus Hendrikus Vermeulen, Eindhoven (NL); Sujan Pandey, Eindhoven (NL)

(73) Assignee: NXP B.V., Eindhoven (NL)

( * ) Notice: Subject to any disclaimer, the term of this patent is extended or adjusted under 35 U.S.C. 154(b) by 212 days.

(21) Appl. No.: 13/535,326

(22) Filed: Jun. 27, 2012

(65) Prior Publication Data
US 2014/0003253 A1  Jan. 2, 2014

(51) Int. Cl.
*H04L 12/43* (2006.01)

(52) U.S. Cl.
USPC .......................................... 370/458

(58) Field of Classification Search
None
See application file for complete search history.

(56) References Cited

U.S. PATENT DOCUMENTS

| | | | | |
|---|---|---|---|---|
| 5,721,534 A * | 2/1998 | Olds et al. | ..................... | 340/7.38 |
| 5,940,440 A | 8/1999 | Werner et al. | | |
| 6,337,851 B1 * | 1/2002 | Charny et al. | ................. | 370/232 |
| 6,633,606 B1 | 10/2003 | Oh | | |
| 7,170,931 B2 | 1/2007 | Greiss et al. | | |
| 2002/0027953 A1 | 3/2002 | Hwang et al. | | |
| 2005/0058149 A1 * | 3/2005 | Howe | ............................ | 370/428 |
| 2007/0002734 A1 * | 1/2007 | Kim et al. | ..................... | 370/229 |
| 2010/0202347 A1 * | 8/2010 | Sridhara et al. | ............... | 370/328 |

OTHER PUBLICATIONS

Sato, "A Method of Self-Recovering Equalization for Multilevel Amplitude-Modulation Systems", IEEE Transactions on Communications, Jun. 1975, p. 679-682.
Godard, "Self-Recovering Equalization and Carrier Tracking in Two-Dimensional Data Communication Systems", IEEE Transactions on Communications, vol. COM-28, No. 11, Nov. 1980, p. 1867-1875.
FlexRay Communications System Preliminary Central Bus Guardian Specification Version 2.0.9, Dec. 15, 2005, pp. 1-38.
FlexRay Communications System Protocol Specification Version 2.1 Revision E, Consortium internal release, Jun. 5, 2009, pp. 1-318.
FlexRay Communications System Protocol Specification Version 3.0.1, FlexRay Consortium, Oct. 2010, pp. 1-341.

* cited by examiner

*Primary Examiner* — Brian D Nguyen
*Assistant Examiner* — Roberta A Shand

(57) ABSTRACT

Data communications are effected in a network having a plurality of different network devices, at least two of the network devices connected to a common wired network link and in which each network device is assigned to communicate during different time slots within a communication cycle. Stored communication protocol data is used to evaluate received configuration data specifying a communication schedule. An output indicative of a non-compliant communication is generated if the evaluation indicates that the communication schedule fails to comply with the protocol data. If the communication schedule complies with the stored communication protocol data, the communication schedule is stored and used to communicate data between the network devices, via a central communication circuit according to time slots specified in the evaluated communication schedule.

20 Claims, 3 Drawing Sheets

COMMUNICATIONS APPARATUS, SYSTEM AND METHOD WITH SCHEDULE CHECKING

Figure 1:
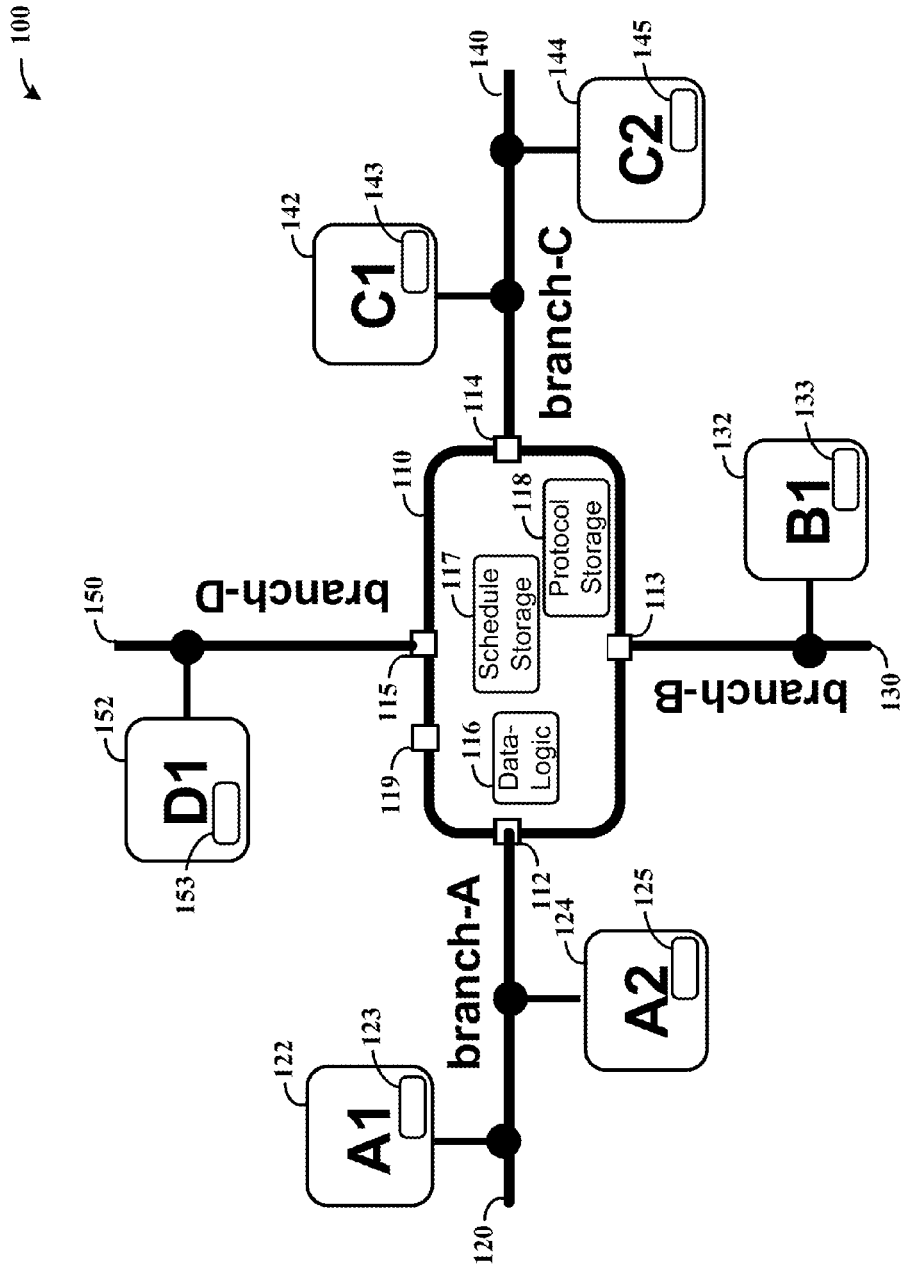

Aspects of various embodiments of the present invention are directed to network communications, such as time-based communications.

In various communications networks, different nodes of a distributed system exchange data through a centralized component. If one of the nodes develops an error, that error may be communicated over the network. Spreading such an error is generally undesirable, particularly on networks such as automotive networks in which safety type components communicate.

One type of communication approach that has been used in certain applications involves time-based communications, in which multiple devices communicate over a common link but at different times. With this approach, a single link can be used in which respective devices on the link are assigned to communicate according to a schedule. However, communication schedules ensuring such operation can become complicated, in order to ensure such operation. Moreover, implementing such schedules, and changes to such schedules, can be difficult to do while maintaining the integrity of protocols via which the communication schedule must be effected.

In addition, where a central network component is used to forward communications to different devices on the network, the accuracy of operation of the central network component becomes very important. For instance, many implementations are directed to communications in which such a central component broadcasts synchronization and scheduling-related information to network devices communicating via the central component. If erroneous scheduling information is broadcast, communications can be significantly hindered.

These and other matters have presented challenges to data communications for a variety of applications.

Various example embodiments are directed to wired network communication circuits and their implementation.

According to an example embodiment, an apparatus includes a wired network having a plurality of network branches in which each branch has a common wire-based pathway, and a plurality of network devices are connected to the network branches. The apparatus further includes a central communication circuit and time-slot communication schedules respectively stored and accessible by each of the network devices. The time-slot communication schedules designate time slots during which each network device is assigned to communicate over one of the plurality of network branches. The central communication circuit includes data-coupling circuitry, a dedicated port for receiving configuration data, and data-logic circuitry. The data coupling circuitry communicatively couples data between the central communication circuit and each of the plurality of network devices through respective ones of the plurality of network branches. The data-logic circuitry uses stored communication protocol data to evaluate configuration data received via the dedicated port and specifying a communication schedule by which the data-logic circuitry is to couple the data between the central communication circuit and the plurality of network devices. In response to the evaluation indicating that the communication schedule does not comply with the stored communication protocol data, the data-logic circuitry generates and communicates an output via the dedicated port and indicative of the non-compliance. In response to the evaluation indicating that the communication schedule complies with the stored communication protocol data, the data-logic circuitry stores and uses the communication schedule to forward communications that are received from network devices to other network devices via the data-coupling circuitry, according to time slots specified in the stored communication schedule.

Another example embodiment is directed to an apparatus for use with time-based communications from a plurality of different network devices, over a plurality of common wired network branches, in which each network device is assigned to communicate according to stored protocol data and during different time slots within a communication cycle. The apparatus includes data-logic circuitry and data-coupling circuitry that communicatively couples data between the network devices and one of the plurality of network branches. The data-logic circuitry uses the stored communication protocol data to evaluate received configuration data specifying a communication schedule by which the data-logic circuitry is to communicate data via the central communication circuit. In response to the evaluation indicating that the communication schedule does not comply with the stored communication protocol data, the data-logic circuitry generates and communicates an output indicative of the non-compliance. In response to the evaluation indicating that the communication schedule complies with the stored communication protocol data, the data-logic circuitry stores and uses the communication schedule to communicate data between the network devices and the central communication circuit according to time slots specified in the stored communication schedule.

Other embodiments are directed to methods for time-based communications from a plurality of different network devices in which at least two of the network devices are connected to a common wired network link and each network device is assigned to communicate during different time slots within a communication cycle. Configuration data, which specifies a communication schedule by which the data-logic circuitry is to communicate data via the central communication circuit, is evaluated using stored communication protocol data. In response to the evaluation indicating that the communication schedule does not comply with the stored communication protocol data, an output indicative of the non-compliance is generated and communicated. In response to the evaluation indicating that the communication schedule complies with the stored communication protocol data, the communication schedule is stored and used to communicate data between the network devices and the central communication circuit according to time slots specified in the stored communication schedule.

The above discussion/summary is not intended to describe each embodiment or every implementation of the present disclosure. The figures and detailed description that follow also exemplify various embodiments.

Figure 2:
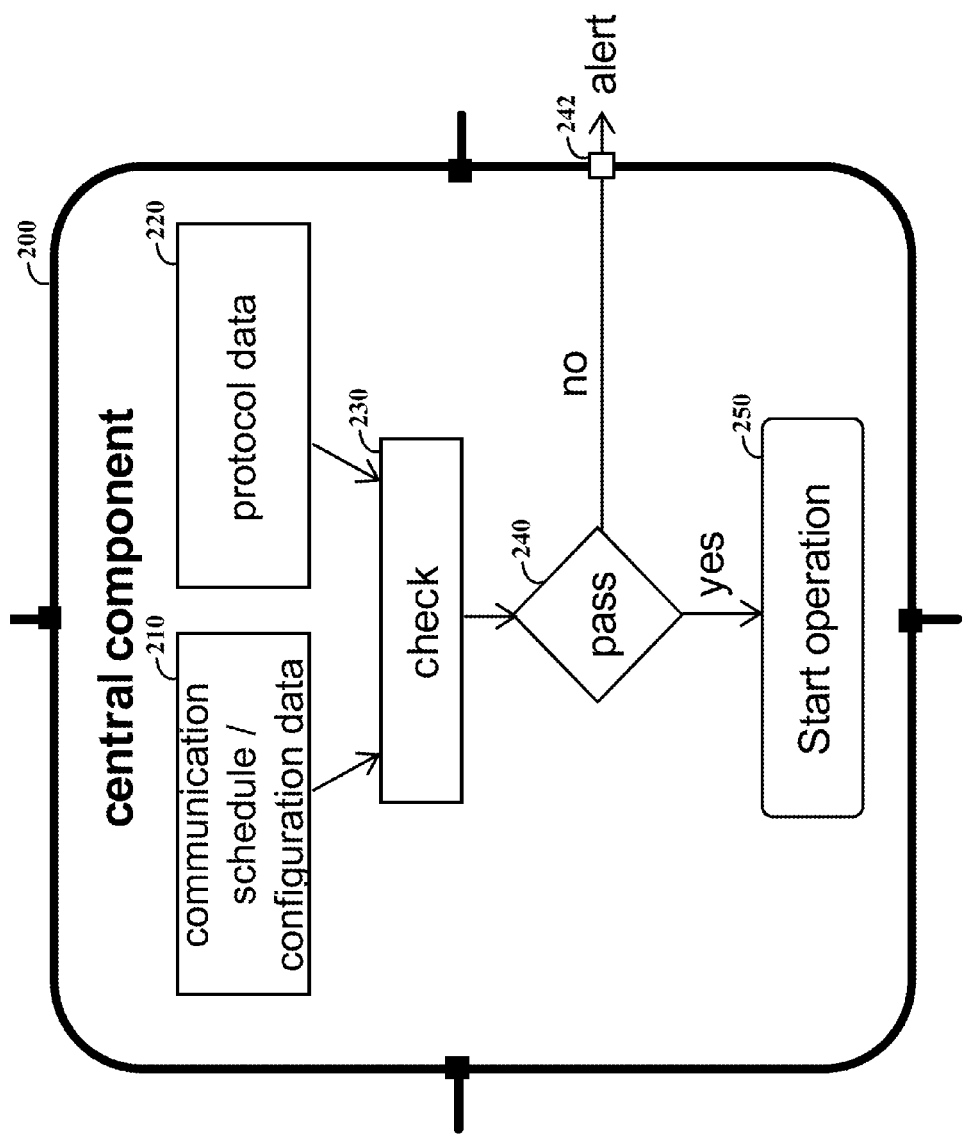
Figure 3:
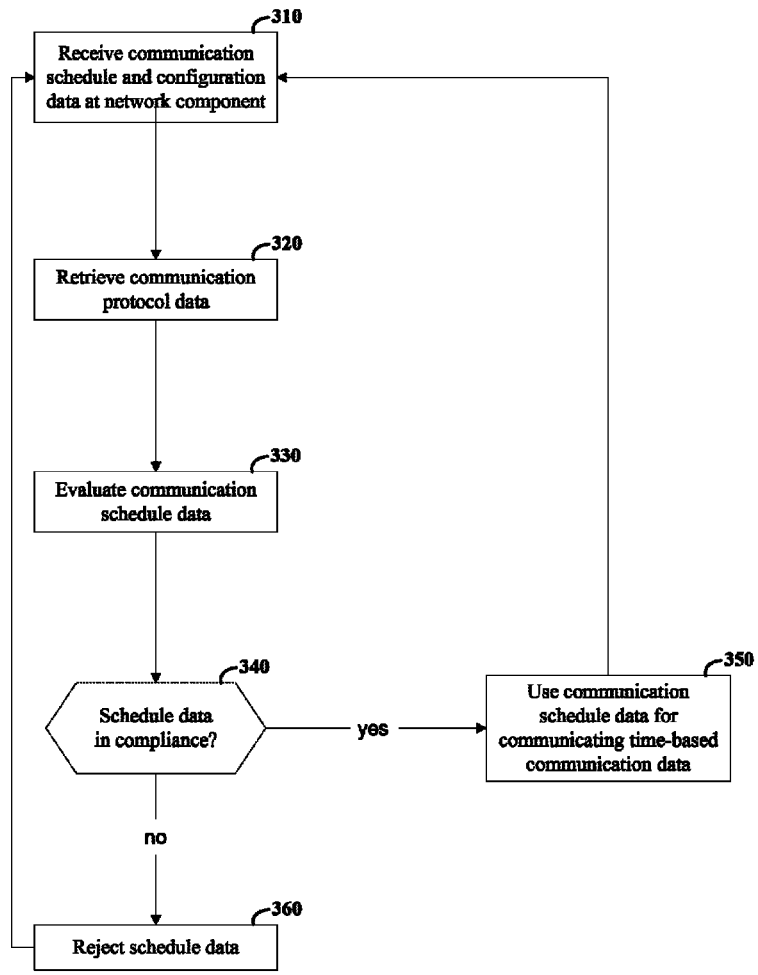

Various example embodiments may be more completely understood in consideration of the following detailed description in connection with the accompanying drawings, in which:

FIG. 1 shows a network communication apparatus and system, in accordance with one or more example embodiments of the present invention;

FIG. 2 another apparatus for communication using verified communication schedules, in accordance with another example embodiment of the present invention; and FIG. 3 shows a flow diagram for communicating using verified communication schedules, in accordance with another example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of devices, systems and arrangements involving time-based data communications between different network branches, with some or all of the branches having two or more components communicating thereupon. While the present invention is not necessarily so limited, various aspects of the invention may be appreciated through a discussion of examples using this context.

Various example embodiments are directed to network communication apparatuses, systems and methods in which a communication schedule and/or configuration data is assessed for errors at one or more network nodes, based upon stored protocol data thereat (e.g., stored protocol semantics by which configuration and/or communication schedule data must abide). This approach may involve, for example, evaluating received configuration data specifying a communication schedule by which data is to be communicated, against stored protocol data at a network node at which the schedule is received, and therein ensuring that the schedule complies with the protocol prior to implementation. This may, for example, facilitate the installation of a new communication node in the field, as may be applicable to automotive networks in which a user's vehicle is updated after the manufacture of the vehicle (e.g., at an automotive repair shop, or as downloaded at a user's vehicle in response to an update).

The protocol data as referenced herein may include one or more of a variety of types of data, as may be applicable to different implementations. In one example, such data may identify semantics of a protocol, which can be used to identify whether communication schedules and configuration data as provided for use in the system complies with the protocol. Such semantics may include, for example, time-based semantics specifying that certain frames (e.g., synchronization related frames) should be broadcast to all branches, and not to a few branches, to ensure that all branches are appropriately time-synchronized. Another example type of semantics specifies that data frames from more than one branch should not be forwarded to one destination branch, to mitigate or avoid data collision and resulting corruption on the destination branch. Yet another example semantic specifies that a branch must not send data during a time slot during which the branch is scheduled to receive data, also to avoid data collision and potential corruption. Still another example type of semantic specifies minimum and maximum values for different protocol parameters, via which given values can be checked to ensure that they fit within the acceptable limit. Accordingly, communication schedule and configuration data are evaluated against the semantics and implemented based on the evaluation (e.g., communication schedule and configuration data that match required semantics are accepted).

In one embodiment, time division multiple access (TDMA) protocols are used to maintain synchronization among nodes on different branches. For example, a FlexRay protocol is implemented in some embodiments, in which sync frames are broadcast to all branches to keep them sufficiently synchronized. In other embodiments, a TTEthernet protocol is used, in which dedicated messages called protocol control frames are transmitted to establish and maintain system-wide clock synchronization, and the central component checks that the synchronization related frames are scheduled to be broadcast on all branches. In certain FlexRay based applications, a central component, as discussed herein operates in accordance with one or more of the following: 1) checking that, for every destination branch, there is no more than one source branch, during any static time slot of a schedule; 2) checking that no destination branch is scheduled to be a source of another branch, during any static time slot; and 3) checking each protocol parameter against specified minimum and maximum values supported by the protocol.

Accordingly, supplied communication schedule and configuration data is evaluated against known semantics of the protocol. If they match, the supplied communication schedule and configuration data is accepted. If they do not match, the supplied communication schedule and configuration data is rejected. Once the scheduling information has been evaluated as complying with the stored protocol information, the central network component communicates data between the network devices connected thereto via wired network branches, according to the evaluated scheduling information.

A more particular example embodiment is directed to an apparatus including a central network component having a dedicated configuration port via which the central network component receives updated scheduling information, by which the central network component forwards data received from network devices, to other network devices. In some implementations, the central network component also uses updated scheduling information to communicate scheduling information to network devices connected thereto via a wired network, and at which devices the scheduling information is stored and used to communicate with the central network component. Prior to using the updated scheduling information, one or more of the central network component and the network devices evaluate the scheduling information against stored protocol data. Specifically, built-in intelligence operates to autonomously check the communication schedule supplied against the semantics of an underlying communication protocol. If the check fails, the component does not accept the supplied communication schedule, and an alert signal is given to a system designer for subsequent action.

In another more particular embodiment, an apparatus includes a wired network including network branches and network devices of which each device is connected to a common communication link of one of the network branches, and communicates using a time-slot communication schedule that designates time slots during which the network device is assigned to communicate. A central communication circuit (e.g., a central gateway circuit) includes data-coupling circuitry that communicates data between each of the plurality of network devices through respective ones of the plurality of network branches and via the central communication circuit, in accordance with an assigned communication/data-forwarding schedule. Data-logic circuitry receives communications from each network device using a time slot assigned for the network device, and selectively forwards the received communication to another one of the network branches. When a new communication schedule is received at the central communication circuit, or when the central communication circuit is first implemented with a programmed communication schedule, the data-logic circuitry evaluates the communication schedule against stored protocol information accessible by the central communication circuit, and further stores and implements the communication schedule for the communication between the plurality of network devices, via the central communication circuit. If the data-logic circuitry evaluates the communication schedule as failing to comply with the stored protocol information, the communication schedule is not used in communicating between the plurality of network devices.

In yet another particular embodiment, a network device as discussed above operates to evaluate time-slot scheduling data as received and by which the device communicates data. The network device stores protocol information pertaining to a communication protocol that the device must use. If the time-slot scheduling data is evaluated as complying with the protocol, the network device uses (e.g., stores and accesses) the scheduling data for communicating with the central communication circuit. In some implementations, both the central communication circuit and the network devices evaluate received scheduling data (e.g., as received at the central communication circuit and/or as delivered from the central communication circuit to the respective network devices).

Various embodiments are directed to time-based communications involving a time division multiple access (TDMA) technique, in which a data forwarding schedule is provided to a central component that uses the scheduling data to forward frames between one or more network branches coupled to the central component. The scheduling data is evaluated against stored protocol information, and is stored and used based on the evaluation.

In certain embodiments, communication schedule data is evaluated and implemented as discussed herein using in-vehicle networks (IVNs), such as for automobiles, trains, airplanes and other vehicles. For instance, various embodiments are directed to implementations involving automotive protocols such as the FlexRay protocol, in which communication schedule data is evaluated according to the protocol prior to implementation.

In some implementations, one or more embodiments as discussed herein are implemented with FlexRay protocol applications specifically targeting the communication needs of safety critical in-vehicle networks that use TDMA to exchange data during static segments, often via a central component (e.g., a Central Bus Guardian) that monitors incoming frames against different rules. Such rules may include, for example, identifying as erroneous: 1) a data frame that appears from a branch during a time slot when the branch is not supposed to transmit; 2) a data frame that appears from a branch too late within its scheduled time slot such that the frame may cause a slot boundary violation; and 3) a data frame that appears from a branch with incorrect header information or checksum. The central component evaluates received communication schedule data to be used for effecting the communication of data, against the rules themselves, as may involve mixing run-time checks with design-time evaluation of the schedule.

For general information regarding communication protocols, and for specific information regarding communication protocols that may be implemented in connection with one or more example embodiments, reference may be made to the "FlexRay Communications System Protocol Specification," ver 3.0; and to the "FlexRay Communications System Preliminary Central Bus Guardian Specification," ver 2.0.9, both available from the FlexRay consortium and fully incorporated herein by reference.

The various example embodiments as discussed herein are implemented with different systems, on different platforms, and with different environments (e.g., automotive, manufacturing and others) to suit a variety of applications. One such application involves a branch-type active star device TJA1085 available from NXP Semiconductors of Eindhoven, The Netherlands. Accordingly, various embodiments are directed to implementation with such a device in an automotive network.

Turning now to the figures, FIG. 1 shows a network communication apparatus and system 100, in accordance with one or more example embodiments of the present invention. The apparatus 100 includes a central communication circuit 110, and is shown by way of example as having four branches 120, 130, 140 and 150 (e.g., wire-based pathways), with each branch including one or more network communication devices. By way of example, branches 120 and 140 are shown each having two network devices, with branch 120 having devices 122 and 124, and branch 140 having devices 142 and 144. Branches 130 and 150 are shown each respectively having single network devices 132 and 152. Each network device includes a data storage component that stores time-slot communication schedule data respectively at 123, 125, 133, 143, 145 and 153. The central communication circuit 110 includes data-coupling circuitry including input/output interface circuits (or ports) 112, 113, 114 and 115 (and, e.g., interconnects within the circuit 110), a data-logic circuit 116 that forwards data according to both a communication schedule stored at 117 and protocol data stored at 118. The central communication circuit 110 also includes an input configured port 119 designated for receiving configuration data (e.g., from an external source) including communication schedule data (and, e.g., protocol data) for communicating with the respective network devices.

The data-logic circuit 116 assesses schedule data received via the configuration port to verify that the received data complies with protocol data stored at 118. If the received schedule data complies with protocol data stored at 118, the data-logic circuit 116 stores the data at 117 and uses the data for communication over the network branches 120, 130, 140 and 150. For example, the data-logic circuit 116 may replace stored configuration data with the received (and evaluated) configuration data, when the data is in compliance with the protocol data stored at 118.

In some embodiments, one or more of the network devices evaluates received communication schedule data against stored protocol data. Accordingly, some or all semantic checking can be carried out at the one or more network devices. In such embodiments, referring to network device 122 by way of example, the protocol data is stored at data storage component 123. When time slot schedule data is received via the central communication circuit 110, the network device uses the stored protocol data to evaluate the time slot schedule data. Based on the evaluation indicating that the data is proper, the network device 122 also stores the time slot schedule data at data storage component 123 and uses the stored time slot schedule data to communicate over the branch 120 and with the central communication circuit 110.

In this context, one or more of the network devices and the central communication circuit 110 in FIG. 1, each of which may be implemented separately or with another device in accordance with different embodiments, automatically determines whether received scheduling data is proper. This approach facilitates robust implementation and, for example, modification that may occur in the field. For instance, when implemented as an in-vehicle network, the apparatus and system 100 (one or more components thereof) autonomously ensure that received communication schedule data is in compliance with the protocol. This approach is useful, for example, to ensure that new scheduling information as may be provided by an automotive service technician or via another source (e.g., remote download to a vehicle via the Internet) complies with the protocol, prior to implementation.

In some embodiments, the network devices 122 and 124 store time slot data at 123 and 125 that assign the respective devices to communicate during different (e.g., mutually exclusive)

time slots on the network branch 120. Each device 122 and 124 also includes a microcontroller that accesses the stored time slot data and an input/output port through which the microcontroller communicates with the branch 120 (e.g., a two-wire common wired-based pathway) in accordance with the time slot data. The microcontrollers evaluate received scheduling data and, based on the evaluation, implement the received data for communicating accordingly.

In some embodiments, the central communication circuit 110 communicates time slot communication schedule data to one or more of the respective network devices (e.g., 122), based upon the evaluated communication schedule. The one or more of the network devices receiving the communicated time-slot communication schedule being configured and arranged to store and use the received time-slot communication schedule to communicate data to another one of the network devices, via the central communication circuit 110. In some implementations, each of the one or more network devices further evaluates the received time-slot communication schedule using stored protocol data to ensure compliance therewith, prior to using the received time-slot communication schedule to communicate data. This approach may be helpful, for example, to ensure that the received time-slot communication has not been corrupted, and that the central communication circuit 110 has provided an appropriate schedule (e.g., where the central communication circuit may communication different schedules specifically tailored for each network device).

FIG. 2 shows another apparatus 200 for communication using verified communication schedules, in accordance with another example embodiment of the present invention. The apparatus may, for example, be implemented with one or more of the network components as shown in FIG. 1 (e.g., as or in the central communication circuit 110). The apparatus 200 includes a stored communication schedule/configuration data 210 and stored protocol data 220 that is used, at 230, via built-in intelligence to semantically check the communication schedule for compliance with data-forwarding requirements specified in the protocol/semantic data. If the check passes at block 240, the communication schedule/configuration data stored at 210 is used to start communication at block 250. If the check fails at block 240, an alert is generated and provided via output 242, and the stored communication schedule/configuration data 210 is not used to forward data. In some instances, communication schedule data is checked before it is stored. In other instances, communication schedule data is reverted to a previous version, and used to communicate until new communication schedule data is received and checked positively.

FIG. 3 shows a flow diagram for communicating using verified communication schedules, in accordance with another example embodiment of the present invention. The diagram shown in FIG. 3 is amenable for use with time-based communications from a plurality of different network devices connected to wired network links, and each network device is assigned to communicate during different time slots within a communication cycle. This example embodiment is discussed in this context.

At block 310, configuration data specifying a communication schedule by which the time-based communications are to be effected is received. At block 320, communication protocol data is retrieved and, at block 330, the communication protocol data is used to evaluate the communication schedule in the configuration data. If the evaluation indicates that the communication schedule complies with the protocol at block 340, the communication schedule is used at block 350 for communicating time-based communications between the plurality of network devices. In some instances, this communication involves storing the communication schedule at block 350 in a location accessible for use in effecting the time-based communications.

If the evaluation indicates that the communication schedule fails to comply with the protocol at block 340, an error message is generated and output at block 360 to alert of the failure. The communication schedule is not used to communicate data between the network devices, such as by not storing the data and/or reverting to a previous communication schedule.

In some implementations, the communication protocol schedule is received and evaluated on a network device connected between two other network devices on a common wired network link. In another implementation, the communication protocol schedule is received and evaluated at a central communication circuit that forwards data between network devices on different branches according to the received communication schedule.

In some implementations, the approach shown in FIG. 3 is carried out in part at a central communication node connected to respective network branches, in which error-indicative communications are not forwarded to other branches. In some embodiments, a central network component as discussed herein assesses communications received along various network branches from devices connected to the branches. When a communication is assessed to be error-indicative, the central network component does not forward the communication to other branches and also drives the originating branch from which the communication is received to ensure that other network devices on the same branch do not accept/process the communication. This approach can be carried out, for example, to ensure that those devices on the originating branch that may receive the communication in an error-free condition do not update, accept and/or process the communication. With respect to automotive applications, this approach can ensure that safety-related communications, such as those involved in communication from a braking system, are distributed consistently to different network components.

Another more particular example embodiment is directed to an apparatus including a central network component that confines errors within a branch in which the error has originated, and within a time slot during which the branch accesses the central network component. As consistent with the above discussion, this confinement may involve forwarding data from such a branch during time slots not designated as being error-indicative, while not forwarding data from one or more time slots designated as error-indicative. This approach facilitates continued communications with non-faulty nodes on a branch in which the fault has originated, while mitigating communications from faulty nodes. This communication approach can be effected without knowledge or identification of a particular node from which the faulty communication is provided, using an understanding that each node communicates during a designated time slot or slots. In some implementations, the central network component collects and analyzes error statistics to determine whether time slots are to be designated as being error-indicative, such as by using a multi-dimensional table as discussed further herein.

Still another embodiment is directed to an apparatus employing two or more of the above referenced-aspects together. In one implementation, such an apparatus operates to evaluate received communications schedules against protocol data, and to also drive against branches via which communications are received according to a validated communication schedule, when an error-indicative communication is received on the branch. In another implementation, such an apparatus operates to evaluate received communications schedules against protocol data, and to also evaluate time slots at which communications are received for errors, based on a validated communication schedule; when a time slot is determined to be in error, communications received over a network branch and on the time slot are not forwarded/processed while communications received on the network branch during different time slots are forwarded/processed. In another implementation, an apparatus operates to drive against branches when an error-indicative communication is received on the branch, and also evaluates time slots at which communications are received over the branch for errors, and actively ignores (e.g., does not forward and/or process) data received during time slots indicative as having an error.

Based upon the above discussion and illustrations, those skilled in the art will readily recognize that various modifications and changes may be made to the present invention without strictly following the exemplary embodiments and applications illustrated and described herein. For example, various approaches may be used to ensure that incoming scheduling data complies with an appropriate protocol. In addition, one or more components of the various apparatuses and systems described herein may be implemented separately or together, in accordance with one or more example embodiments. Such modifications do not depart from the true spirit and scope of the present invention, including that set forth in the following claims.

What is claimed is:

1. An apparatus comprising:
   a wired network including a plurality of network branches each having a common wire-based pathway;
   a plurality of network devices connected to the network branches;
   a plurality of time-slot communication schedules respectively stored and accessible by each of the network devices, the plurality of time-slot communication schedules designating time slots during which each network device is assigned to communicate over one of the plurality of network branches; and
   a central communication circuit having
      data-coupling circuitry configured and arranged for communicatively coupling data between the central communication circuit and each of the plurality of network devices through respective ones of the plurality of network branches,
      data-logic circuitry configured and arranged to,
         using stored communication protocol data, evaluate received configuration data specifying a communication schedule by which the data-logic circuitry is to couple the data between the central communication circuit and the plurality of network devices,
         in response to the evaluation indicating that the communication schedule does not comply with the stored communication protocol data, generate and communicate an output indicative of the non-compliance, and
         in response to the evaluation indicating that the communication schedule complies with the stored communication protocol data, store and use the communication schedule to forward communications that are received from network devices to other of the network devices via the data-coupling circuitry, according to time slots specified in the stored communication schedule.

2. The apparatus of claim 1, wherein
   the communication protocol data is data that identifies semantics of the protocol, and
   each of the network devices stores the communication protocol data, including protocol semantic data, and is configured and arranged to communicate via the wired network using one of the time-slot communication schedules.

3. The apparatus of claim 1, wherein each of the network devices stores the communication protocol data and is configured and arranged to
   evaluate one of the stored time-slot communication schedules using the stored communication protocol data, and
   in response to the evaluation indicating that the evaluated stored time-slot communication schedule complies with the communication protocol data, communicate via the wired network using the evaluated time-slot communication schedule.

4. The apparatus of claim 1, wherein the data-logic circuitry is configured and arranged to transmit time-slot communication schedules to the plurality of network devices, each time-slot communication schedule being based upon the evaluated communication schedule, each of the plurality of network devices being configured and arranged to store and use the transmitted time-slot communication schedules to communicate data to another one of the network devices, via the central communication circuit.

5. The apparatus of claim 4, wherein each of the network devices stores the communication protocol data and is configured and arranged to
   evaluate the transmitted time-slot communication schedules using the stored communication protocol data, and
   in response to the evaluation indicating that the transmitted time-slot communication schedule complies with the communication protocol data, communicate via the wired network using the transmitted time-slot communication schedule.

6. The apparatus of claim 1, wherein the network devices in each branch are directly coupled to the common wire-based pathway and communicate on the wire-based pathway during mutually exclusive time slots, the communication schedule specifying the time slots over which each network device is to communicate in each of the branches, and via which the central communication circuit is to forward data on each of the branches.

7. The apparatus of claim 1, wherein the central communication circuit includes a plurality of input/output ports connected to and for communicating over the respective network branches, including a dedicated port for receiving configuration data, the dedicated port being communicatively coupled to the data-logic circuitry and communicatively uncoupled from the data coupling circuitry.

8. The apparatus of claim 1, wherein each network device includes a microcontroller and an input/output port through which the microcontroller communicates with the common wire-based pathway and the central communication circuit.

9. The apparatus of claim 1, wherein the data-logic circuitry is configured and arranged to replace stored configuration data with the evaluated configuration data, in response to the evaluation indicating that the communication schedule complies with the stored communication protocol data.

10. For use with time-based communications from a plurality of different network devices, over a plurality of common wired network branches, each network device being assigned to communicate according to stored protocol data and during different time slots within a communication cycle, an apparatus comprising:

data-coupling circuitry configured and arranged for communicatively coupling data between the network devices and one of the plurality of network branches; and data-logic circuitry configured and arranged to, using the stored communication protocol data, evaluate received configuration data specifying a communication schedule by which the data-logic circuitry is to communicate data via a central communication circuit, in response to the evaluation indicating that the communication schedule does not comply with the stored communication protocol data, generate and communicate an output indicative of the non-compliance, and in response to the evaluation indicating that the communication schedule complies with the stored communication protocol data, store and use the communication schedule to communicate data between the network devices and the central communication circuit according to time slots specified in the stored communication schedule.

11. The apparatus of claim 10, further including the central communication circuit, the central communication circuit including the data-coupling circuitry and the data-logic circuitry, the central communication circuit being configured and arranged with central communication schedule data to forward communications between the network devices according to a time slot defined in the evaluated communication schedule.

12. The apparatus of claim 10, wherein the apparatus includes one of the plurality of network devices that includes the data-coupling circuitry and the data-logic circuitry, the one of the plurality of network devices being configured and arranged to communicate via the wired network branches according to a time slot defined in the evaluated communication schedule.

13. The apparatus of claim 10, wherein the apparatus includes the plurality of network devices and each of the network devices is configured and arranged to communicate according to a time-slot communication schedule specific to the network device and respectively stored and accessible by the network device.

14. The apparatus of claim 10, further including data-coupling circuitry configured and arranged for communicatively coupling data between the data-logic circuitry and the plurality of network devices.

15. The apparatus of claim 10, further including data-coupling circuitry configured and arranged for communicatively coupling data between the data-logic circuitry and the plurality of network devices, each network device coupled to one of a plurality of network branches.

16. The apparatus of claim 10, wherein the data-logic circuitry is configured and arranged to transmit time-slot communication schedules to the plurality of network devices, each time-slot communication schedule being based upon the evaluated communication schedule.

17. The apparatus of claim 10, wherein the data-logic circuitry is configured and arranged to communicate with the network devices on the respective wired network branches to which the devices are coupled during mutually exclusive time slots.

18. For use with time-based communications from a plurality of different network devices, at least two of the network devices connected to a common wired network link in which each network device is assigned to communicate during different time slots within a communication cycle, a method comprising:

Using a stored communication protocol data, evaluating received configuration data specifying a communication schedule by which a data-logic circuitry is to communicate data via a central communication circuit;

in response to the evaluation indicating that the communication schedule does not comply with the stored communication protocol data, generating and communicating an output indicative of the non-compliance; and in response to the evaluation indicating that the communication schedule complies with the stored communication protocol data, storing and using the communication schedule to communicate data between the network devices and the central communication circuit according to time slots specified in the stored communication schedule.

19. The method of claim 18, wherein the at least two of the network devices includes first, second and third network devices, the second network device being connected between the first and third network device on the common wired network link, and the steps of evaluating, generating and outputting, and storing and using are carried out at the second network device for receiving communications from the first network device and forwarding the received communications to the third network device.

20. The method of claim 18, wherein the plurality of network devices are connected to respective wired network branches of an in-vehicle automotive network, each branch being connected to the central communication circuit, which forwards data between network devices on different branches according to the received communication schedule, and the steps of evaluating, generating and outputting, and storing and using are carried out at the central communication circuit for the configuration data as received via a designated configuration port that is external to the wired network.

* * * * *